Patented Jan. 4, 1938

2,104,424

UNITED STATES PATENT OFFICE 2,104,424

MANUFACTURE OF AROMATIC DERIVATIVES

Vladimir Ipatieff and Aristid V. Grosse, Chicago, Ill., assignors to Universal Oil Products Company, Chicago, Ill., a corporation of Delaware No Drawing. Application March 7, 1935, Serial No. 9,830

5 Claims. (Cl. 260—168)

This invention relates particularly to the manufacture of alkyl and aryl derivatives of aromatic hydrocarbons. More specifically it has reference to a process for manufacturing such derivatives characterized by the use of particularly suitable catalysts and conditions of operation.

The present process is a contribution to the art of effecting condensation or alkylation reactions among different classes of hydrocarbons, being specific in the present instance to reactions between naphthene and aromatic hydrocarbons in which the principal structural alterations occur among the naphthenes.

Reactions are known between olefin hydrocarbons and aromatic hydrocarbons in the presence of suitable catalysts to produce alkylated derivatives and similar condensations have been effected between olefins and naphthene hydrocarbons. The catalysts usually found preferable in these reactions are the mineral acids, sulfuric and phosphoric acids and metal salts such as, for example, zinc and aluminum chlorides, etc. In this type of reaction at least one of the reacting constituents, to-wit, the olefin, is characterized by a double bond and the primary reaction when using, for example, an acid catalyst, may be assumed to be the formation of an intermediate ester which then reacts with the ring compound to substitute an alkyl group for a ring hydrogen atom and regenerate the acid for further catalysis. This type of reaction is never 100% efficient as a number of side reactions invariably occur such as, for example, the formation of olefin polymers as well as alkylated ring compounds. In the case of acid such as sulfuric acid and particularly when employing high molecular weight hydrocarbons, a certain amount of oxidation also takes place which destroys some of the acid and a corresponding amount of hydrocarbon. While the composition of the intermediate reaction products is more difficult of determination when using heavy metal halides to accelerate these reactions, their presence is more or less definitely indicated by the formation of heavy sludges from which both hydrocarbons and heavy metal salt residues are obtainable either by hydrolysis or heating.

In one specific embodiment the present invention comprises the manufacture of alkyl and/or aryl derivatives of aromatic hydrocarbons by interacting naphthene hydrocarbons therewith in the presence of catalysts comprising essentially aluminum chloride and hydrogen chloride.

The present type of reaction is distinct from the majority of previously employed reactions among hydrocarbons in that saturated ring or naphthene hydrocarbons are employed as the source of alkyl and/or aryl groups so that the overall process involving the primary formation of unsaturated radicals or compounds from the naphthenes and secondarily their combination with the aromatic compounds may be designated under the general term "destructive alkylation." It has been observed that when naphthene hydrocarbons alone are treated with aluminum chloride at normal or slightly elevated temperatures that a considerable amount of decomposition occurs with the formation of compounds boiling over a fairly wide range of temperature. In the case of cyclohexane as the base member of the hexamethylene series, the products resulting from moderate heating in the presence of aluminum chloride boil within the range of approximately 90–250° C. and comprise members of several groups of hydrocarbons including paraffins, olefins and alkyl derivatives. We have shown according to the present invention that when this decomposition is effected in the presence of aromatic hydrocarbons that the initially formed radicals combine to a large extent with the aromatics to form alkyl and aryl derivatives so that the aromatic hydrocarbons may be considered as "acceptors". Thus the type and extent of the naphthene decomposition is modified and useful derivatives of aromatic hydrocarbons are producible by varying both the naphthene and aromatic hydrocarbons which are caused to react, the amount of catalyst and to some extent the conditions of operation. The type of reaction with which the present process is concerned therefore involves the naphthenes or a group of hydrocarbons which is capable of yielding both alkyl and aryl residues on decomposition, the aromatics as a group which is capable of being readily alkylated and arylated by said residues, and a particular catalyst combination capable of accelerating the reactions to a definite and practical degree.

The invention may comprise the use of any naphthene hydrocarbon to react upon and form derivatives with any aromatic hydrocarbon either mono or polynuclear. Naphthene hydrocarbons include both hydrogenated aromatics containing 6 carbon atoms in the rings or other cyclic compounds containing 3, 4, 5 and 7 methylene groups. The character and ease of decomposition of the naphthenes to furnish the substituting groups will vary with each compound and particularly with the number of carbon atoms in the ring.

As a rule the 6 carbon atom naphthenes are most readily decomposed. For the sake of indicating the broad scope of the invention the following tables are appended which show some of the individual hydrocarbons of the groups involved in the present types of reactions.

*Naphthene hydrocarbons*

| Name | Formula | Boiling point ° C. |
|---|---|---|
| Cyclopropane | $C_3H_6$ | −35 |
| Cyclobutane | $C_4H_8$ | 12 |
| Cyclopentane | $C_5H_{10}$ | 49 |
| Cyclohexane | $C_6H_{12}$ | 81 |
| Cycloheptane | $C_7H_{14}$ | 117 |
| Methylcyclopentane | $C_6H_{12}$ | 72 |
| Dimethylcyclopentane | $C_7H_{14}$ | 91 |
| Methylcyclohexane | $C_7H_{14}$ | 93 |
| Dimethylcyclohexane | $C_8H_{16}$ | 97 |
| Trimethylcyclohexane | $C_9H_{18}$ | 198 |

The above list comprises a few representative naphthene hydrocarbons and is given to illustrate types of compounds which yield residues which combine with aromatic hydrocarbons to form different types of derivatives under the influence of the preferred catalysts.

*Mono-nuclear aromatic hydrocarbons*

| Name | Formula | Boiling point ° C. |
|---|---|---|
| Benzol | $C_6H_6$ | 80.4 |
| Toluol | $C_6H_5CH_3$ | 110.3 |
| Xylols, dimethyl-benzols | $C_6H_4(CH_3)_2$ | |
| o-Xylol | | 142 |
| m-Xylol, Isoxylol | | 139 |
| p-Xylol | | 138 |
| Ethyl-benzol | $C_6H_5CH_2CH_3$ | 136 |
| Trimethyl-benzols | $C_6H_3(CH_3)_3$ | |
| (1,2,3)=hemimellithol | | 175 |
| (1,2,4)=pseudo-cumol | | 170 |
| (1,3,5)=mesitylene | | 164.5 |
| Methyl-ethyl-benzols | $C_6H_4(CH_3)(C_2H_5)$ | |
| o- or (1,2)-benzols | | 159 |
| m- or (1,3)-benzols | | 159 |
| p- or (1,4)-benzols | | 162 |
| n-Propyl-benzol | $C_6H_5CH_2CH_2CH_3$ | 158.5 |

The above table indicates a few of the lower molecular weight hydrocarbons of the benzene series, principally those in which ring hydrogen atoms have been partially replaced by alkyl groups. The present invention is not concerned with the further treatment of aromatic compounds which represent complete alkylation of the hydrocarbon.

In the practice of the invention different modes of procedure may be followed to effect the desired reactions. When some of the reacting constituents are liquid and others are gaseous or vaporous at the preferred temperatures of treatment, the reactions of destructive alkylation may be brought about by introducing the gaseous components into a suspension of anhydrous aluminum chloride in the liquid reactant. This condition of affairs is illustrated by the case of cyclobutane and benzol. A suspension of aluminum chloride is maintained in benzol by the ebullition of the latter under a reflux condenser, and the gaseous naphthene is introduced into the suspension at some optimum rate depending upon the extent of the reaction desired. In case both reactants are liquid, as, for example, toluene and cyclohexane, the aluminum chloride may be maintained in suspension by mechanical means or heating convection currents in either of the hydrocarbons while the other is introduced as a liquid or a vapor, or the two liquids may be mixed in suitable proportions and heated gradually in the presence of the catalyst. With some combinations of compounds the last-named method of procedure may involve some risk dependent upon the control of the reaction at a critical temperature which may take place with too great speed unless the reaction mixture is cooled.

In all cases it is essential that a definite although small amount of hydrogen chloride be present to assist in catalyzing the desired reactions. This may be introduced in any convenient manner such as, for example, in admixture with the gases or vapors which are introduced under the surface of hydrocarbon liquid in which aluminum chloride is suspended according to one of the above mentioned modes of procedure or introduced separately as a substantially dry gas when the reacting hydrocarbons are both liquid.

Owing to the widely varying boiling ranges and somewhat variable properties of the homologs of the two general groups involved in the present type of reaction, it is evident that the temperature and pressure conditions and the amount of catalyst necessary for promoting the desired reactions cannot be stated to lie within very definite ranges. For each combination of naphthene and aromatic hydrocarbon there will exist an optimum set of conditions in respect to these factors for a given degree and type of alkylation or arylation which is best determined on a small scale before transferring the process to large scale commercial plants.

The primary reactions whereby radicals are made available for alkylating or arylating aromatic hydrocarbons according to the present process result both from ring splitting and dehydrogenation reactions. Thus in the case of the alkylation of aromatics with cyclohexane, the latter compound evidently splits up both into ethylene and hexyl radicals since both ethyl (or isomeric dimethyl) aromatics and also hexyl derivatives are found among the reaction products. The two general reactions of ring splitting and the shifting and release of hydrogen are characteristic of the present type of reaction. Under the preferred operating conditions which include temperatures up to approximately 200° C. there is only a small decomposition effect upon the aromatic hydrocarbons and particularly upon benzol, the base member of the aromatic series.

The following example includes the numerical data obtained in one case involving the interaction of naphthenes and aromatics according to the present process. While it is characteristic and sufficiently illustrative of the general character of such results, it is not to be taken as imposing exactly corresponding limitations upon the scope of the invention.

Equal parts of cyclohexane and benzol were saturated with gaseous hydrogen chloride and were heated for 24 hours at a temperature of 175° F. in contact with 20% of their combined weights of anhydrous aluminum chloride. The reaction was conducted in a closed pressure vessel and under a pressure of added hydrogen equal to 30 atmospheres at normal temperatures.

The said liquid product consisted of two layers. The upper layer was washed with alkali and water and distilled into two fractions: (1) up to 90° (41%); (2) 90–250° (59%). The presence of aromatic hydrocarbons was determined in the second fraction by treatment with fuming sulfuric acid (15% oleum).

*Properties of product obtained by action of aluminum chloride on mixture of cyclohexane and benzene*

| Fraction No. | Boiling point, °C. | Aromatic hydrocarbons |
|---|---|---|
| 1 | Up to 90 | 46 |
| 2 | 90-120 | 74 |
| 3 | 120-200 | 80 |
| 4 | 200-360 | 71 |

| Fraction No. | Boiling point, °C. | Amount cc. | $n_D^{14}$ | Organic analysis |  |  |  |
|---|---|---|---|---|---|---|---|
| | | | | Found | | Calculated | |
| | | | | C % | H % | C % | H % |
| 1 | 78-116 | 9.8 | 1.4565 | | | | |
| 2 | 116-132 | 12.9 | 1.4590 | | | | |
| 3 | 132-140 | 5.2 | 1.4730 | | | | |
| 4 | 140-142 | 6.8 | 1.4845 | 90.2 | 9.8 | 90.6 | 9.4 |
| 5 | 160-228 | 17.9 | 1.4890 | | | | |
| 6 | 228-252 | 9.9 | 1.5018 | | | | |
| 7 | 252 | | 1.5280 | | | | |

Investigation of the liquid products indicated that alkylation of benzene by ethylene (formed by decomposition of cyclohexane) had taken place to the extent of at least 15%, forming the products boiling between 140° and 144°. Distillation of fractions 5 and 6 gave a hydrocarbon boiling at 210-215° which, according to analysis, and also its reaction with nitrating mixture indicated that it was cyclohexyl benzene,

$C_6H_{11}.C_6H_5.$

This last-named product was formed from a molecule of benzene and one of cyclohexane by the elimination of hydrogen under the influence of the aluminum chloride-hydrogen chloride catalyst. This reaction is analogous to the action of aluminum chloride upon cyclohexane and benzene separately, reactions which result in the formation of dicyclohexyl and its isomer from the former and of diphenyl from the latter.

The nature of the invention and the character and results obtainable by its use are shown by the preceding specification and single example though neither is to be considered as unduly limiting its generally broad scope.

We claim as our invention:

1. A process which comprises reacting a naphthene hydrocarbon with an aromatic hydrocarbon capable of being alkylated in the presence of aluminum chloride and hydrogen chloride and in the substantial absence of added olefins to form a hydrocarbon derivative of the aromatic.

2. A process which comprises reacting a naphthene hydrocarbon with an aromatic hydrocarbon selected from the group consisting of benzene and its homologues, in the presence of aluminum chloride and hydrogen chloride and in the substantial absence of added olefins to form a hydrocarbon derivative of the aromatic.

3. A process which comprises reacting a naphthene hydrocarbon selected from the group consisting of cyclohexane and its homologues with an aromatic hydrocarbon capable of being alkylated in the presence of aluminum chloride and hydrogen chloride and in the substantial absence of added olefins to form a hydrocarbon derivative of the aromatic.

4. A process which comprises reacting a naphthene hydrocarbon with an aromatic hydrocarbon capable of being alkylated in the presence of aluminum chloride and hydrogen chloride and in the substantial absence of added olefins at a temperature not substantially in excess of 200° C. to form a hydrocarbon derivative of the aromatic.

5. A process for producing hydrocarbon derivatives of aromatics which comprises reacting a naphthene hydrocarbon with a mono-nuclear aromatic hydrocarbon in the presence of aluminum chloride and hydrogen chloride and in the substantial absence of added olefins at a temperature not substantially in excess of 200° C.

VLADIMIR IPATIEFF.
ARISTID V. GROSSE.